UNITED STATES PATENT OFFICE.

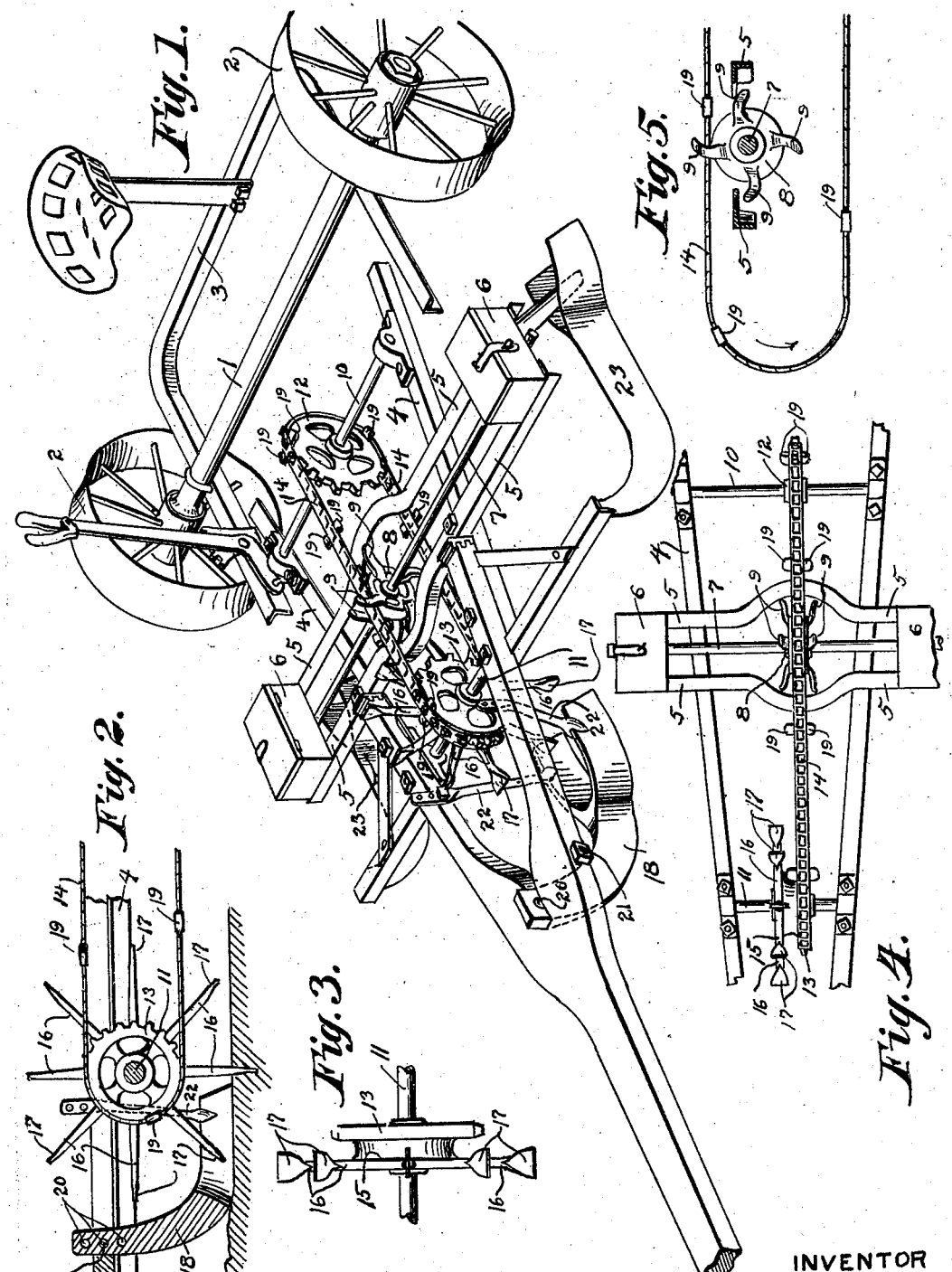

EMMANUELL H. SNYDER, OF CANTON, OHIO.

CORN-PLANTER.

No. 805,888. Specification of Letters Patent. Patented Nov. 28, 1905.

Application filed September 8, 1905. Serial No. 277,599.

*To all whom it may concern:*

Be it known that I, EMMANUELL H. SNYDER, a citizen of the United States, residing at Canton, in the county of Stark and State of Ohio, have invented certain new and useful Improvements in Corn-Planters; and I do hereby declare that the following is a full, clear, and exact description of the same, reference being had to the annexed drawings, making a part of this specification, and to the numerals of reference marked thereon, in which—

Figure 1 is a perspective view showing the different parts of my invention properly arranged and applied to a corn-planter. Fig. 2 is a side elevation of the check-row chain and driving-wheel and its sprocket-wheel, showing a portion of the planter-frame and illustrating the position of the leveling-runner. Fig. 3 is an edge view of the check-row chain and driving-wheel, showing said parts properly mounted upon their shaft. Fig. 4 is a top view showing portions of the seedboxes and illustrating my improvement properly connected and arranged with reference to said seedboxes; and Fig. 5 is a side elevation of the operating or check-chain-actuating wheel, showing same in proper relative position with reference to the chain.

The present invention has relation to corn-planters; and it consists in the novel arrangement hereinafter described, and particularly pointed out in the claims.

Similar numerals of reference indicate corresponding parts in all figures of the drawings.

In the accompanying drawings, 1 represents the main axle, upon which is mounted the traveling and covering wheels 2. The axle is secured to the frame 3 in the usual manner, which frame within itself forms no particular part of the present invention, except that the usual frame is to be employed. The adjustable frame 4 is of the usual construction, except so far as my improved devices are concerned and the manner of attaching the same in proper relative position so that the dropping mechanism can be operated; but the dropping mechanism forms no part of the present invention, but my improvement consists in the manner of operating the dropping mechanism independent of the traveling wheels and in such a manner that the proper checking will be brought about independent of the usual check-wires. To the frame 4 are attached the bars 5, which bars support the seedboxes 6, together with the seeding mechanism contained therein. The shaft 7 is properly journaled and upon which shaft is securely mounted the dropping-mechanism-actuating wheel 8, which wheel is provided with any desired number of radial arms 9, which arms are for the purpose hereinafter described. At the front and rear of the shaft 7 are located the shafts 10 and 11, which shafts are provided with sprocket-wheels 12 and 13 and around which sprocket-wheels is located the operating or check chain 14, which check-chain is so arranged that its upper portion will be located between the members of the spaced radial arms 9, said arms being so spaced that the chain is free to move independent of said arms, except as hereinafter described. Upon the shaft 11 is securely mounted the wheel 15, which wheel is provided with the spokes 16, which spokes are so arranged that they will enter the ground, and as the planter proper is moved over the ground a rotary motion will be imparted to the wheel 15 and the shaft 11, thereby imparting motion to the check-chain 14 for the purpose of insuring a uniform motion to the wheel 15. The outer ends of the spokes 16 are provided with the blades 17, which may be formed of any desired width to produce the proper ground-contact.

For the purpose of removing any obstacle that might interfere with the proper rotation of the wheel 15 by means of the bladed arms 16 the bifurcated runner 18 is provided, which bifurcated runner is located directly in front of the wheel 15, as illustrated in the drawings, and is so located that the spokes will come in engagement with the ground as they move downward between the bifurcated members of the runner 18.

For the purpose of imparting intermittent rotary motion to the shaft 7 and of course to the dropping mechanism the check-chain 14 is provided with the lugs 19, which lugs are formed of such a size that they will engage the spaced or bifurcated arms 9 and move said arms when in contact therewith.

For the purpose of insuring a uniform intermittent rotary movement the arms 9 are curved, the concaved edges of which are located toward approaching contact-lugs, by which arrangement the proper contact will be brought about as between the lugs and the arms 9 and such a contact that the lugs are not moved while in contact with the arms without carrying with them the arms during the time of contact.

It will be understood that the lugs 19 should be so spaced that the proper space will be produced as between the hills of corn or points where seed is to be dropped, and for the purpose of adjusting the space as between the hills of corn or place where seed is to be dropped the lugs 19 may be adjusted to or from each other or different chains may be attached for different-spaced hills.

For the purpose of adjusting the runner 18 to or from the frame 4 the end of said runner is provided with a series of apertures 20, through which apertures and the frame 4 the connected bolt 21 is passed and is securely clamped in the usual manner. The purpose of providing adjustment for the runner is to regulate the depth said runner is to enter the ground, as it is well understood that in some instances the ground is of a rougher nature than others; but the runner should be so adjusted that all lumps or other obstacles will be removed, so that they will not interfere in any manner with the arms designed to impart rotary motion to the driving-wheel.

For the purpose of holding the runner at its rear end or the bifurcated members thereof the braces 22 are provided, which braces are adjustably connected to the frame at their upper ends.

It will be understood that in order to properly prepare the ground for the seed to be dropped the usual runners or shoes 23 are to be employed; but they within themselves form no part of the present invention, except that in order to produce a complete and operative planter they must necessarily be employed.

Having fully described my invention, what I claim as new, and desire to secure by Letters Patent, is—

1. In a planter of the class described, a traveling frame, seeding mechanism carried by the frame, an intermittent-rotating shaft adapted to actuate the seeding mechanism, a shaft carried by the frame said shaft provided with a wheel having ground-engaging spokes, the shaft upon which the ground-engaging wheel is located provided with an endless-operating-chain-propelling wheel, a wheel mounted upon the intermittent-rotating shaft, and means secured to the operating-chain adapted to actuate the wheel and the intermittent-rotating shaft, substantially as and for the purpose specified.

2. In a planter of the class described, a traveling frame, seeding mechanism carried by the frame, an intermittent-rotating shaft, shafts located upon opposite sides of the intermittent-rotating shaft, said shafts provided with sprocket-wheels, an operating-chain located around said sprocket-wheels and a propelling-wheel adapted to rotate by ground engagement, and a bifurcated runner located forward of the operating-chain-propelling wheel, substantially as and for the purpose specified.

3. In a planter of the class described, a traveling frame, seeding mechanism carried by the frame, an intermittent-rotating shaft, said intermittent-rotating shaft provided with a wheel having curved arms, an endless operating-chain provided with means adapted to intermittently rotate the seed-actuating shaft, shafts located upon opposite sides of the intermitting-rotating shaft, said shafts provided with sprocket-wheels adapted to carry and propel the operating-chain, and one of the shafts provided with a spoked wheel, the spokes thereof adapted for ground engagement, substantially as and for the purpose specified.

In testimony that I claim the above I have hereunto subscribed my name in the presence of two witnesses.

EMMANUELL H. SNYDER.

Witnesses:
Jos. J. Hosler,
F. W. Bond.